(12) United States Patent
Saeki

(10) Patent No.: US 8,893,839 B2
(45) Date of Patent: Nov. 25, 2014

(54) BATTERY COOLING STRUCTURE FOR VEHICLE

(75) Inventor: Koji Saeki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/552,901

(22) Filed: Jul. 19, 2012

(65) Prior Publication Data

US 2013/0025953 A1    Jan. 31, 2013

(30) Foreign Application Priority Data

Jul. 26, 2011  (JP) ................................ 2011-163512

(51) Int. Cl.
| | |
|---|---|
| *B60K 1/04* | (2006.01) |
| *B60L 11/18* | (2006.01) |
| *H01M 10/613* | (2014.01) |
| *H01M 10/625* | (2014.01) |
| *H01M 10/647* | (2014.01) |
| *H01M 10/6554* | (2014.01) |
| *H01M 10/6563* | (2014.01) |
| *H01M 10/6566* | (2014.01) |
| *B60K 1/00* | (2006.01) |

(52) U.S. Cl.
CPC ....... *B60L 11/1874* (2013.01); *H01M 10/5004* (2013.01); *H01M 10/5016* (2013.01); *H01M 10/5032* (2013.01); *H01M 10/5053* (2013.01); *H01M 10/5067* (2013.01); *H01M 10/5073* (2013.01); *B60K 1/04* (2013.01); *B60L 11/1879* (2013.01); *H01M 2220/20* (2013.01); *Y02T 10/7005* (2013.01); *Y02T 10/705* (2013.01); *B60K 2001/005* (2013.01); *B60K 2001/0438* (2013.01)

USPC ........................................................ 180/68.5

(58) Field of Classification Search
CPC ............... B60K 1/04; B60K 2001/003; B60K 2001/005; B60K 2001/0438; H01M 2/1083; B60L 11/18
USPC ..................... 180/68.5; 429/71, 120
See application file for complete search history.

(56) References Cited

U.S. PATENT DOCUMENTS

| | | | | |
|---|---|---|---|---|
| 4,135,593 | A | * | 1/1979 | Fowkes ........................ 180/65.1 |
| 5,376,479 | A | * | 12/1994 | Gerner ........................ 429/204 |
| 5,620,057 | A | * | 4/1997 | Klemen et al. ............... 180/68.5 |

(Continued)

FOREIGN PATENT DOCUMENTS

| | | |
|---|---|---|
| CN | 102007619 A | 4/2011 |
| JP | 52-35023 | 3/1977 |

(Continued)

*Primary Examiner* — Frank Vanaman
(74) *Attorney, Agent, or Firm* — Oblon, Spivak, McClelland, Maier & Neustadt, L.L.P.

(57) ABSTRACT

A battery cooling structure for a vehicle includes: a vehicle body floor part; and a battery module that is located under the vehicle body floor part, and that is arranged such that a clearance is formed between the battery module and the vehicle body floor part and an airflow that is introduced from the front side of a vehicle body into the clearance is discharged from the rear end of the clearance. At least one of the vehicle body floor part and the battery module has a wall portion that is formed so as to gradually decrease the area of a cross-section of the clearance, the cross-section being perpendicular to the longitudinal direction of the vehicle body, along the direction toward the rear of the vehicle body.

4 Claims, 4 Drawing Sheets

(56) References Cited

U.S. PATENT DOCUMENTS

| | | | |
|---|---|---|---|
| 5,853,058 A * | 12/1998 | Endo et al. | 180/65.1 |
| 6,106,972 A * | 8/2000 | Kokubo et al. | 429/120 |
| 6,335,116 B1 * | 1/2002 | Yamane et al. | 429/176 |
| 2004/0016580 A1 * | 1/2004 | Kronner et al. | 180/68.5 |
| 2006/0060402 A1 * | 3/2006 | Abe et al. | 180/68.5 |
| 2006/0093901 A1 * | 5/2006 | Lee et al. | 429/120 |
| 2010/0073005 A1 * | 3/2010 | Yano et al. | 324/427 |

FOREIGN PATENT DOCUMENTS

| | | |
|---|---|---|
| JP | 7-17265 | 1/1995 |
| JP | 2006-88773 | 4/2006 |
| JP | 2006-92805 | 4/2006 |
| JP | 2007-326474 A | 12/2007 |
| JP | 2008-300088 | 12/2008 |
| JP | 2010-221749 | 10/2010 |

* cited by examiner

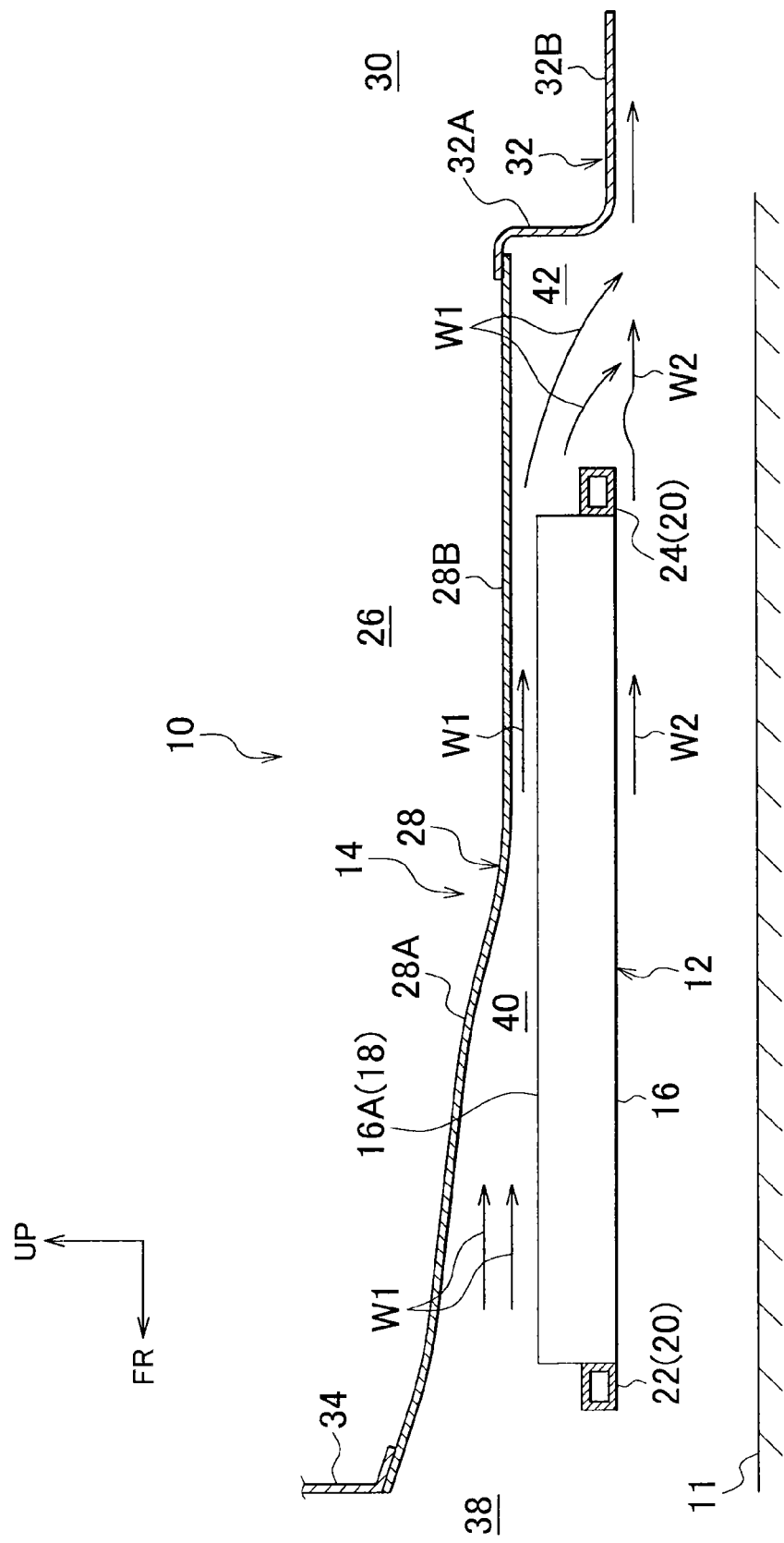

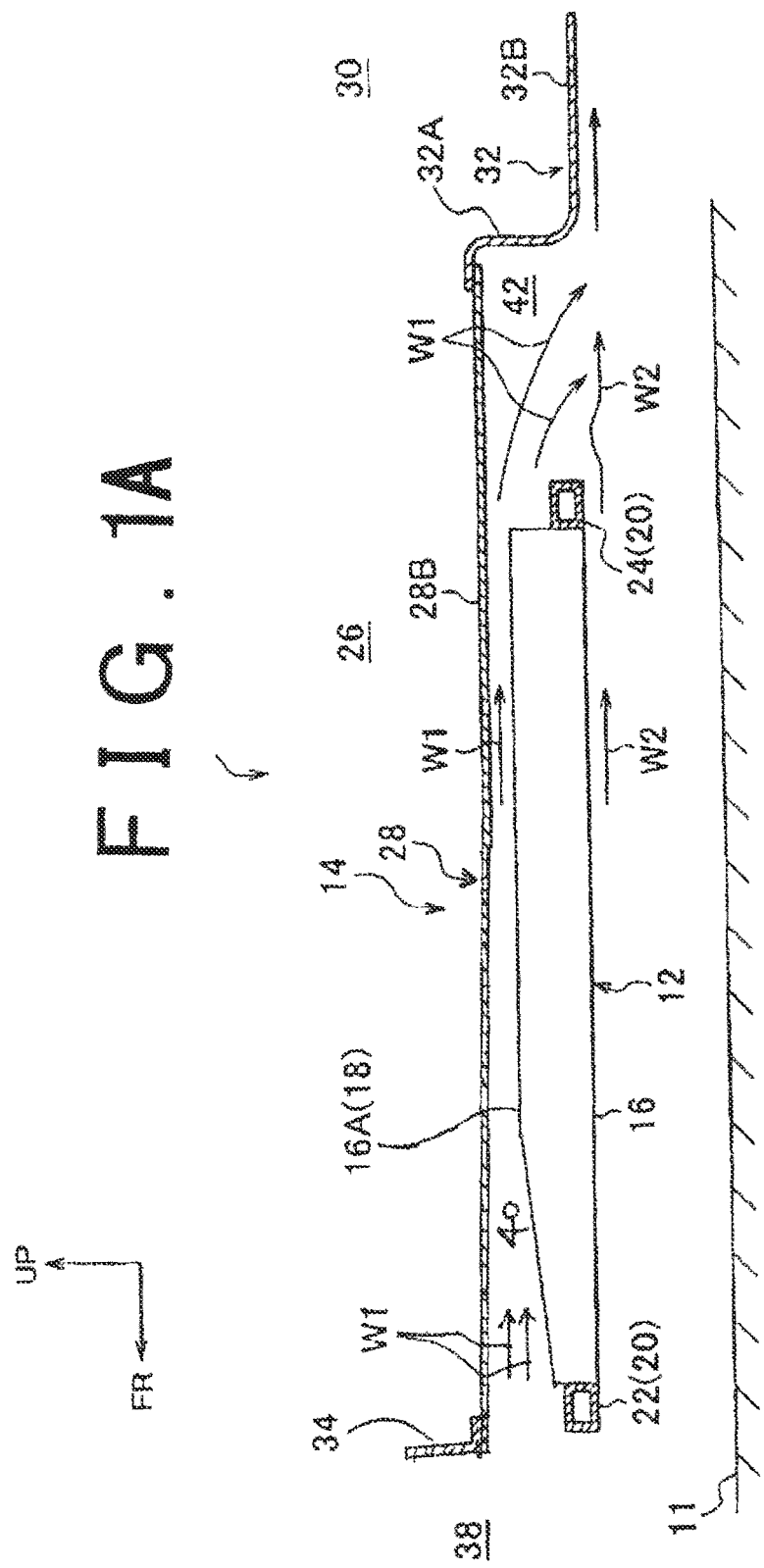

FIRST COMPARATIVE EXAMPLE

SECOND COMPARATIVE EXAMPLE

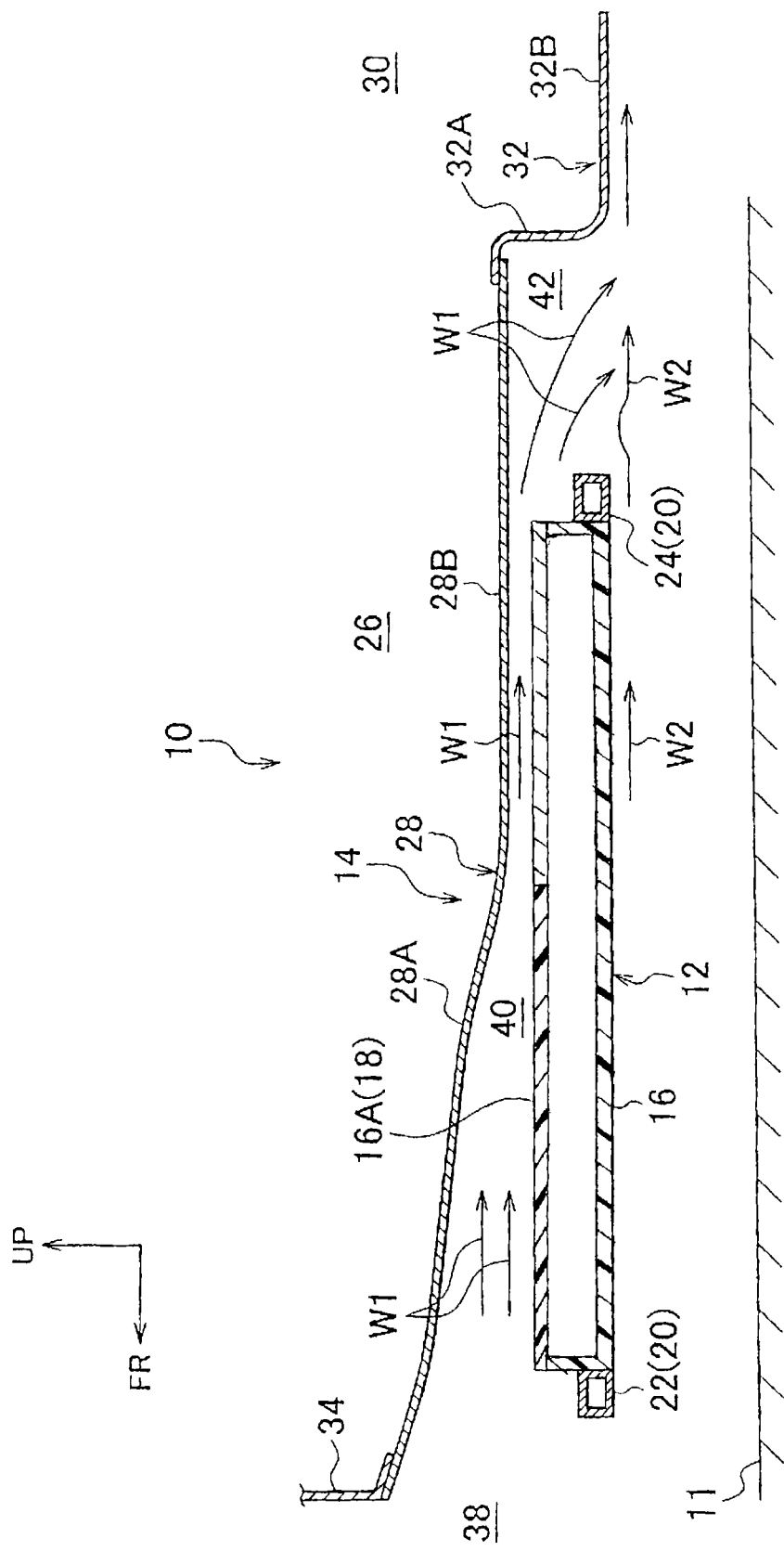

BATTERY COOLING STRUCTURE FOR VEHICLE

INCORPORATION BY REFERENCE

The disclosure of Japanese Patent Application No. 2011-163512 filed on Jul. 26, 2011 including the specification, drawings and abstract is incorporated herein by reference in its entirety.

BACKGROUND OF THE INVENTION

1. Field of the Invention

The invention relates to a battery cooling structure for a vehicle, which is adopted to cool a battery module arranged under a vehicle body floor part.

2. Description of Related Art

A battery cooling system described in Japanese Patent Application

Publication No. 2006-092805 (JP 2006-092805 A) has an accommodating recess that is formed in the bottom face of a floor of a vehicle so as to accommodate a battery, and a baffle that is provided upstream of the battery in the direction of an airflow (a flow of air that is generated when the vehicle is travelling) and that introduces the airflow into the accommodating recess. The battery cooling system cools the battery with the use of the airflow.

However, in the battery cooling system described above, the airflow introduced into the accommodating recess strikes the battery (battery module). This may affect the motion performance of the vehicle.

SUMMARY OF THE INVENTION

The invention provides a battery cooling structure for a vehicle, which improves both the battery cooling performance and the motion performance of a vehicle.

An aspect of the invention relates to a battery cooling structure for a vehicle, including: a vehicle body floor part; and a battery module that is located under the vehicle body floor part, and that is arranged such that a clearance is formed between the battery module and the vehicle body floor part and an airflow that is introduced from the front side of a vehicle body into the clearance is discharged from the rear end of the clearance. At least one of the vehicle body floor part and the battery module has a wall portion that is formed so as to gradually decrease the area of a cross-section of the clearance, the cross-section being perpendicular to the longitudinal direction of the vehicle body, along the direction toward the rear of the vehicle body.

In the above battery cooling structure, the area of the cross-section of the clearance formed between the vehicle body floor part and the battery module, the cross-section being perpendicular to the longitudinal direction of the vehicle body, is gradually decreased along the direction toward the rear of the vehicle body by the wall portion that is formed in at least one of the vehicle body floor part and the battery module. Therefore, the flow velocity of the airflow introduced from the front side of the vehicle body into the clearance is increased as the airflow approaches the rear end of the clearance in the direction toward the rear of the vehicle body. Thus, the motion performance of the vehicle is improved. Moreover, the battery cooling performance is also improved because the flow velocity of the airflow that strikes the top face of the battery module is increased.

In the above battery cooling structure, the vehicle body floor part may have the wall portion; and the wall portion may be a slant wall that is slanted downward along the direction toward the rear of the vehicle body.

In the above battery cooling structure, the slant wall formed in the vehicle body floor part is slanted downward along the direction toward the rear of the vehicle body. Therefore, the area of the cross-section of the clearance formed between the vehicle body floor part and the battery module, the cross-section being perpendicular to the longitudinal direction of the vehicle body, is gradually decreased along the direction toward the rear of the vehicle body. As described above, because the slant wall that functions as the wall portion is formed in the vehicle body floor part, for example, the volume of the battery module is set easily as compared with a case where a wall portion (e.g. a slant portion) is formed in the battery module.

In the above battery cooling structure, the vehicle body floor part may have a middle wall that extends from the rear end of the slant wall toward the rear of the vehicle body and extends beyond the rear end of the battery module in the direction toward the rear of the vehicle body, a vertical wall that extends from the rear end of the middle wall downward in the height direction of the vehicle body, and a lower wall that extends from the lower end of the vertical wall toward the rear of the vehicle body. Further, the clearance may be communicated with a space outside of the vehicle body through a space formed between the battery module and the vertical wall. Moreover, the lower wall may be arranged at substantially the same height as the bottom surface of the battery module.

In the above battery cooling structure, the airflow that is introduced into the clearance formed between the slant wall of the vehicle body floor part and the battery module and thus increased in flow velocity proceeds along the middle wall that extends from the rear end of the slant wall toward the rear of the vehicle body. Then, the airflow proceeds beyond the rear end of the battery module in the direction toward the rear of the vehicle body. The vertical wall extends downward from the rear end of the middle wall in the height direction of the vehicle body. The clearance is communicated with a space outside (under) the vehicle body through the space formed between the vertical wall and the battery module. Also, the lower wall arranged at substantially the same height as the bottom face of the battery module extends from the lower end of the vertical wall toward the rear of the vehicle body. Thus, the airflow that proceeds beyond the rear end of the battery module in the direction toward the rear of the vehicle body (hereinafter referred to as "upper airflow") descends through the space formed between the battery module and the vertical wall to join an airflow that proceeds under the battery module (hereinafter referred to as "lower airflow"), and then proceeds along the lower wall toward the rear of the vehicle body. Because the upper airflow with the increased flow velocity joins the lower airflow, the lower airflow is less likely to be drawn up into the space formed between the battery module and the vertical wall. With this configuration, for example, a lower cover (a plate member that prevents the airflow from being drawn up into the space) that is provided between the battery module and the lower wall is omitted. Note that "substantially the same height" means any height at which the above-described effects are obtained.

In the above battery cooling structure, a metal heat conducting portion may be formed in an upper wall of the battery module arranged to face the vehicle body floor part.

In the above battery cooling structure, the airflow that is introduced into the clearance formed between the vehicle body floor part and the battery module and thus increased in flow velocity strikes the metal heat conducting portion that formed in the upper wall of the battery module. Therefore, the heat of the battery module is efficiently dissipated through the heat conducting portion. As a result, the battery cooling performance is further improved.

In the above battery cooling structure, the heat conducting portion may be formed in at least a rear part of the upper wall of the battery module in the longitudinal direction of the vehicle body.

In the above battery cooling structure, the metal heat conducting portion is formed in at least the rear part of the upper wall of the battery module in the longitudinal direction of the vehicle body, i.e., in the part where the flow velocity of the airflow introduced into the clearance between the vehicle body floor part and the battery module becomes high. Thus, it is possible to efficiently cool the battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a vertical sectional view showing the schematic configuration of a battery cooling structure for a vehicle according to an embodiment of the invention;

FIG. 1A is a vertical sectional view showing the schematic configuration of a battery cooling structure for a vehicle according to another embodiment of the invention;

FIG. 4 is a vertical sectional view according to another embodiment of the invention.

DETAILED DESCRIPTION OF EMBODIMENTS

Figure 2:
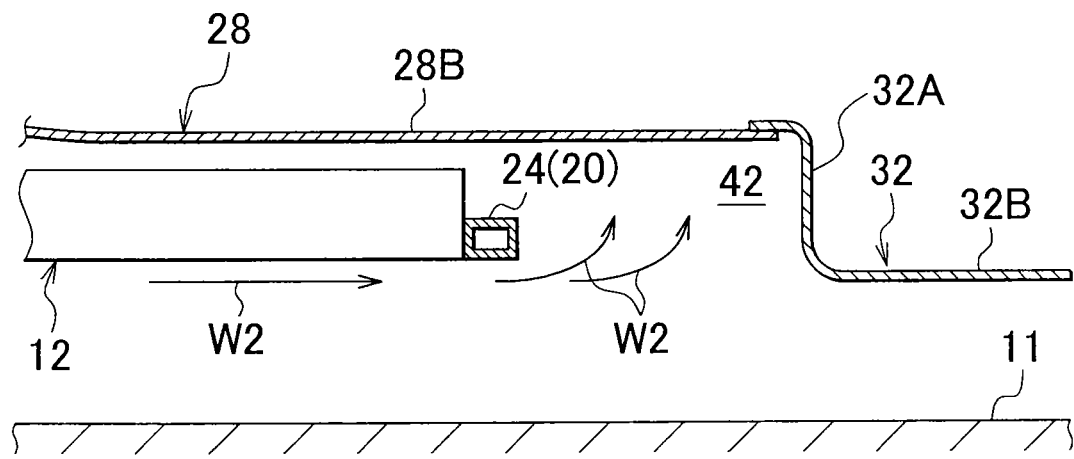
FIG. 2 is a vertical sectional view showing a first comparative example.

Hereinafter, a battery cooling structure for a vehicle according to an embodiment of the invention will be described with reference to FIG. 1 to FIG. 3. In FIG. 1, an arrow FR indicates the direction toward the front of a vehicle body, and an arrow UP indicates the direction toward the top of the vehicle body.

FIG. 1 is a vertical sectional view showing the schematic configuration of a battery cooling structure 10 for a vehicle (hereinafter, simply referred to as "battery cooling structure 10") according to the embodiment of the invention. FIG. 1 shows the battery cooling structure 10 seen from one side of the vehicle body in the lateral direction of the vehicle body (the left-hand side of the vehicle body). The vehicle is a vehicle with a battery module 12, and examples of the vehicle include an electric vehicle, a gasoline hybrid vehicle, and a fuel cell hybrid vehicle. The battery cooling structure 10 according to the embodiment is applied to such vehicles.

As shown in FIG. 1, in the present embodiment, the battery module 12 is arranged under a vehicle body floor part 14 (arranged between the vehicle body floor part 14 and a ground surface 11). The battery module 12 includes an exterior member (case) 16 that accommodates a battery (e.g. a lithium-ion secondary battery). The exterior member 16 is formed in a shape of a box with a low height, and arranged at the center in the lateral direction of the vehicle body with its longitudinal direction extending in the longitudinal direction of the vehicle. The exterior member 16 has an upper wall 16A that is almost entirely formed of a heat conducting portion 18 that is made of a steel (metal) plate, and the remaining part of the exterior member 16 is made of, for example, resin material. A battery frame 20 is provided around the exterior member 16.

The battery frame 20 is formed in a frame shape, and has a front frame 22 and a rear frame 24 that extend in the lateral direction of the vehicle body and a pair of right and left side frames (not shown) that extend in the longitudinal direction of the vehicle body. The front frame 22 is arranged in front of the exterior member 16, and the rear frame 24 is arranged behind the exterior member 16. The right and left side frames are arranged on the right side and left side of the exterior member 16, respectively. The battery module 12 is fixed to a frame (e.g. a rocker panel) of the vehicle body via the battery frame 20.

The vehicle body floor part 14 includes a floor panel 28 that constitutes a floor part of a vehicle compartment 26, and a luggage floor panel 32 that constitutes a floor part of a luggage room 30. The battery module 12 is arranged under the floor panel 28.

The front end portion of the floor panel 28 is connected with the lower end portion of a dashboard panel 34, and the rear end portion of the floor panel 28 is connected with the front end portion of the luggage floor panel 32. A slant wall 28A (which may function as a wall portion according to the invention) is formed in the front part of the floor panel 28. The slant wall 28A is slanted downward gradually along the direction toward the rear of the vehicle body. Also, a middle wall 28B that is arranged substantially parallel to the longitudinal direction of the vehicle body is formed in the rear part of the floor panel 28. The middle wall 28B extends from the rear end of the slant wall 28A toward the rear of the vehicle body, and extends beyond the rear end of the battery module 12 in the direction toward the rear of the vehicle body.

The luggage floor panel 32 has a vertical wall 32A that is substantially perpendicular to the longitudinal direction of the vehicle, and a lower wall 32B that extends from the lower end of the vertical wall 32A toward the rear of the vehicle body. The vertical wall 32A is arranged at a sufficient distance away from the rear face of the battery module 12 in the direction toward the rear of the vehicle body, and the upper end portion of the vertical wall 32A is connected with the rear end portion of the middle wall 28B of the floor panel 28. Furthermore, the lower wall 32B is arranged substantially parallel to the longitudinal direction of the vehicle body and at substantially the same height as the bottom face of the battery module 12 (in the present embodiment, at a position slightly below the bottom face of the battery module 12).

In the present embodiment, a clearance 40 is formed between the floor panel 28 and the battery module 12. The clearance 40 is in communication with a compartment 38 (a space in which, for example, an engine and a motor are arranged) formed in the front portion of the vehicle body. An airflow (a flow of air that is generated when the vehicle is travelling) that is introduced into the compartment 38 when the vehicle is travelling and an airflow that has passed below the compartment 38 when the vehicle is travelling are introduced into the clearance 40 from the front side of the clearance 40 in the longitudinal direction of the vehicle body. The height of the front portion of the clearance 40, which is formed between the slant wall 28A of the floor panel 28 and the battery module 12, is gradually decreased along the direction toward the rear of the vehicle body. Therefore, the area of a cross-section of the front portion of the clearance 40, the cross-section being perpendicular to the longitudinal direction of the vehicle body, is gradually decreased along the direction toward the rear of the vehicle body. On the other hand, the height of the rear portion of the clearance 40 is substantially constant, and the area of a cross-section of the rear portion of the clearance 40, the cross-section being perpendicular to the longitudinal direction of the vehicle body, is substantially constant in the longitudinal direction of the vehicle body.

The clearance 40 is communicated at its rear end with a space 42 formed between the rear face of the battery module 12 and the vertical wall 32A. The lower end side of the space 42 is open. The clearance 40 is communicated with a space outside (under) the vehicle body through the space 42. Therefore, the airflow introduced into the clearance 40 from the front side of the clearance 40 in the longitudinal direction of the vehicle body is delivered from the rear end of the clearance 40 into the space 42 and then delivered from the lower end of the space 42 to the outside of the vehicle body.

In the battery cooling structure 10 with the above configuration, the slant wall 28A formed in the front part of the floor panel 28 is slanted downward gradually along the direction toward the rear of the vehicle body. Therefore, the area of the cross-section of the clearance 40 formed between the floor panel 28 and the battery module 12, the cross-section being perpendicular to the longitudinal direction of the vehicle body, is gradually decreased along the direction toward the rear of the vehicle body. Thus, the flow velocity of an airflow W1 introduced into the clearance 40 from the front side of the clearance 40 in the longitudinal direction of the vehicle body is increased as the airflow W1 approaches the rear end of the clearance 40 in the longitudinal direction of the vehicle body. This improves the motion performance (aerodynamic performance) of the vehicle. Moreover, the battery cooling performance is improved because the flow velocity of the airflow W1 that strikes the top face of the battery module 12 is increased.

In the present embodiment, the airflow for cooling the battery is blocked to a certain degree by the battery frame 20 that is used to fix the battery module 12 to the vehicle body. However, the battery cooling performance is improved because the top face side of the battery module 12 is cooled by the airflow W1 that is introduced into the clearance 40 as described above. In other words, the battery cooling performance is improved while the collision safety is ensured and the battery module 12 is protected from road debris such as chipping by the battery frame 20.

In the present embodiment, the slant wall 28A by which the area of the cross-section of the clearance 40 is gradually decreased is formed in the floor panel 28. Therefore, for example, the volume of the battery module 12 is set easily as compared with a case where a wall portion (e.g. a slant portion) is formed in, for example, the exterior member 16 of the battery module 12.

In the present embodiment, the airflow W1 that is introduced into the clearance 40 and thus increased in flow velocity proceeds along the middle wall 28B that extends from the rear end of the slant wall 28A toward the rear of the vehicle body. Then, the airflow W1 proceeds beyond the rear end of the battery module 12 in the direction toward the rear of the vehicle body. The vertical wall 32A extends downward from the rear end of the middle wall 28B in the height direction of the vehicle body. The clearance 40 is communicated with a space outside (under) the vehicle body through the space 42 formed between the vertical wall 32A and the rear face of the battery module 12. Also, the lower wall 32B arranged at substantially the same height as the bottom face of the battery module 12 extends from the lower end of the vertical wall 32A toward the rear of the vehicle body. Thus, the airflow W1 that proceeds beyond the rear end of the battery module 12 in the direction toward the rear of the vehicle body (hereinafter referred to as "upper airflow W1") descends through the space 42 formed between the battery module 12 and the vertical wall 32A to join an airflow W2 that proceeds under the battery module 12 (hereinafter referred to as "lower airflow W2"), and then proceeds along the lower wall 32B toward the rear of the vehicle body. Because the upper airflow W1 with the increased flow velocity joins the lower airflow W2, the lower airflow W2 is less likely to be drawn up into the space 42 formed between the battery module 12 and the vertical wall 32A.

Figure 3:
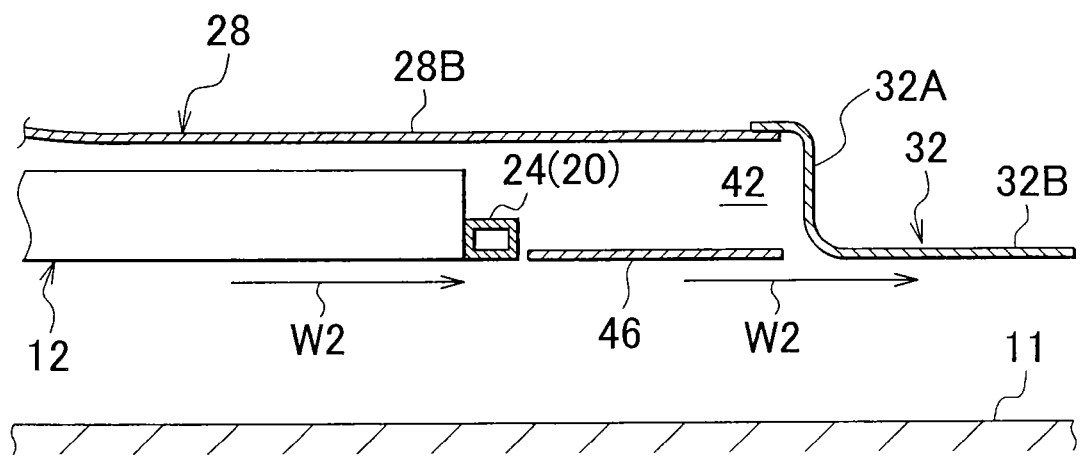
FIG. 3 is a vertical sectional view showing a second comparative example.

FIG. 2 shows a configuration according to a first comparative example. With this configuration, the upper airflow W1 is not generated, which allows the lower airflow W2 to be drawn up into the space 42. As a result, the lower airflow W2 is headed in an inappropriate direction. In a second comparative example shown in FIG. 3, a lower cover 46, which is a flat plate, is arranged between the battery module 12 and the lower wall 32B. In this case, the airflow W2 is prevented from being drawn up into the space 42. However, provision of the lower cover 46 increases the mass and the cost of the vehicle.

In contrast to this, according to the present embodiment, the wind pressure of the upper airflow W1 hinders the lower airflow W2 from being drawn up into the space 42. As a result, the airflow is allowed to be headed in an appropriate direction. Therefore, it is possible to promote vehicle weight reduction and cost reduction while improving the motion performance of the vehicle.

In the present embodiment, the airflow W1 that is introduced into the clearance 40 and thus increased in flow velocity strikes the heat conducting portion 18 that is made of steel and formed in the upper wall 16A of the battery module 12. Therefore, the heat of the battery module 12 is efficiently dissipated through the heat conducting portion 18. As a result, the battery cooling performance is further improved.

The invention may be implemented in various alternative embodiments as described below. In the above embodiment, the upper wall 16A of the exterior member 16 of the battery module 12 is almost entirely formed of the steel heat conducting portion 18. However, the invention is not limited to this configuration. For example, as shown in FIG. 4, only the rear part of the upper wall 16A may be formed of the heat conducting portion 18. The flow velocity of the airflow W1 introduced into the clearance 40 is increased as the airflow W1 approaches the rear of the upper wall 16A. The steel heat conducting portion 18 is formed at a location where the flow velocity of the airflow W1 becomes high. As a result, the battery module 12 is efficiently cooled. Moreover, this configuration makes the weight of the battery module 12 lower than that in the case where the upper wall 16A is almost entirely formed of the steel heat conducting portion 18.

In the above embodiment, the heat conducting portion 18 formed in the upper wall 16A is made of steel (metal). However, the invention is not limited to this configuration. The material of the heat conducting portion 18 is not particularly limited as long as the heat conducting portion 18 is made of a material with higher heat conductivity than the remaining part of the exterior member 16. Further, the heat conducting portion 18 may be omitted in the invention.

In the above embodiment, the vehicle body floor part 14 has the slant wall 28A, the middle wall 28B, the vertical wall 32A, and the lower wall 32B, and the lower wall 32B is arranged at substantially the same height as the bottom face of the battery module 12. However, the invention is not limited to this configuration. The configuration of the vehicle body floor part and the height at which the lower wall 32B is arranged may be changed as needed. For example, even if the lower wall 32B is arranged at a position higher than the bottom face of the battery module 12 and lower than the top face of the battery module 12, the upper airflow W1 joins the lower airflow W2. This hinders the airflow W2 from being drawn up into the space 42. Furthermore, for example, the middle wall 28B and the vertical wall 32A may be omitted, and the slant wall 28A may be extended toward the rear of the vehicle body so as to be contiguous with the lower wall 32B.

Furthermore, in the above embodiment, the area of the cross-section of the rear portion of the clearance 40, the cross-section being perpendicular to the longitudinal direction of the vehicle body, is substantially constant in the longitudinal direction of the vehicle body. However, the invention is not limited to this configuration. For example, the area of the cross-section of the rear portion of the clearance 40, the cross-section being perpendicular to the longitudinal direction of the vehicle, may be increased along the direction toward the rear of the vehicle body.

In the above embodiment, the slant wall 28A formed in the floor panel 28 (vehicle body floor part 14) functions as the wall portion according to the invention. However, the invention is not limited to this configuration, as long as the wall portion is formed in at least one of the vehicle body floor part and the battery module, and the configuration of the wall portion may be changed as needed. For example, in F*ig*. 1A, a slant portion (wall portion) that is slanted upward along the direction toward the rear of the vehicle body may be formed in the upper wall of the battery module.

Furthermore, in the above embodiment, the airflow introduced into the compartment 38 and the airflow that has passed under the compartment 38 are introduced into the clearance 40. However, the invention is not limited to this configuration. For example, only the airflow that has passed under the compartment 38 may be introduced into the clearance 40.

What is claimed is:

1. A battery cooling structure for a vehicle, comprising:
   a battery module that is located under a vehicle body floor part, that is fixed to a frame of a vehicle body via a battery frame having a rear frame disposed at a lower side of a rear face of the battery module and protruded from the rear face toward a rear of the vehicle body, the battery module being arranged next to the rear frame in a stepwise manner in a side view, a clearance is formed between a top face of the battery module and the vehicle body floor part and an airflow that is introduced from a front side of the vehicle body into the clearance is discharged from a rear end of the clearance;
   a slant wall formed in the vehicle body floor part, and slanted downward along a direction toward the rear of the vehicle body so as to gradually decrease an area of a cross-section of the clearance, the cross-section being perpendicular to a longitudinal direction of the vehicle body, along the direction toward the rear of the vehicle body;
   a middle wall that is formed in the vehicle body floor part, that extends from a rear end of the slant wall toward the rear of the vehicle body, and that extends beyond a rear end of the battery module in the direction toward the rear of the vehicle body;
   a vertical wall that is formed in the vehicle body floor part, that extends from a rear end of the middle wall downward in a height direction of the vehicle body such that a space through which the clearance is communicated with a space outside of the vehicle body is formed between the battery module and the vertical wall; and
   a lower wall that is formed in the vehicle body floor part, that extends from a lower end of the vertical wall toward the rear of the vehicle body, and that is arranged at substantially the same height as a bottom face of the battery module.

2. The battery cooling structure according to claim 1, wherein a metal heat conducting portion is formed in an upper wall of the battery module arranged to face the vehicle body floor part.

3. The battery cooling structure according to claim 2, wherein the heat conducting portion is formed in at least a rear part of the upper wall in the longitudinal direction of the vehicle body.

4. The battery cooling structure according to claim 1, wherein the vertical wall is substantially perpendicular to the middle wall.

\* \* \* \* \*